(No Model.)
E. RAUS.
CHIN SUPPORT AND EYE CLOSER FOR THE DEAD.
No. 599,731. Patented Mar. 1, 1898.
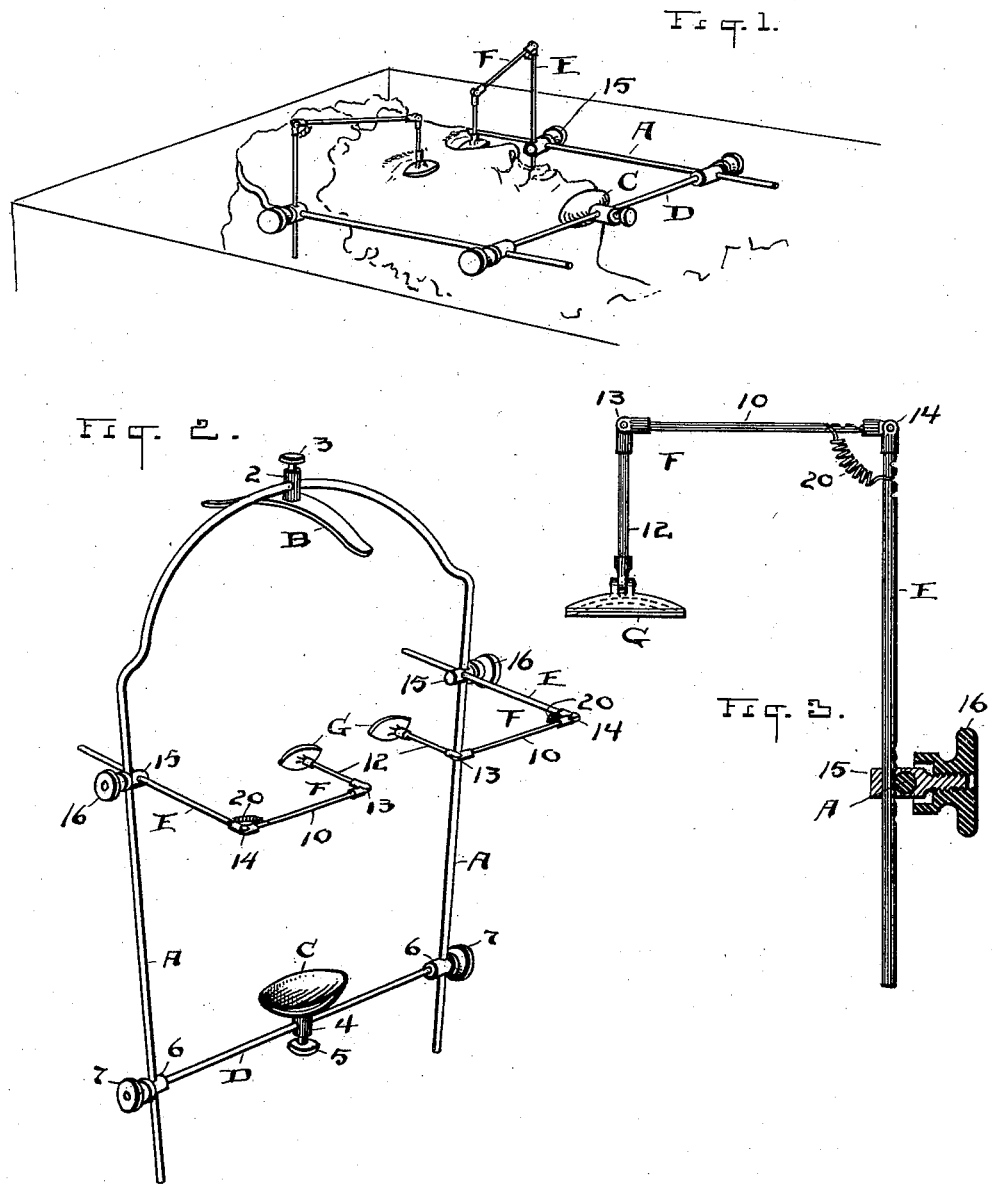
ATTEST
INVENTOR
Erasmus Raus
By H. F. Fisher ATTY

UNITED STATES PATENT OFFICE.

ERASMUS RAUS, OF CLEVELAND, OHIO.

CHIN-SUPPORT AND EYE-CLOSER FOR THE DEAD.

SPECIFICATION forming part of Letters Patent No. 599,731, dated March 1, 1898.

Application filed December 8, 1897. Serial No. 661,145. (No model.)

*To all whom it may concern:*

Be it known that I, ERASMUS RAUS, a citizen of the United States, residing at Cleveland, in the county of Cuyahoga and State of Ohio, have invented certain new and useful Improvements in Cadaver Chin-Supports and Eye-Closers; and I do declare that the following is a full, clear, and exact description of the invention, which will enable others skilled in the art to which it appertains to make and use the same.

My invention relates to a combined chin-support and eye-closer for the dead; and the invention consists in the construction and combination of parts, substantially as shown and described, and particularly pointed out in the claims.

In the accompanying drawings, Figure 1 is a perspective view of the device as it appears in use. Fig. 2 is an elevation of the device with the several parts or members thereof disposed relatively, as they are in Fig. 1. Fig. 3 is an elevation of one of the eye-closing members enlarged, as hereinafter more fully described.

A represents the main frame of the device, which generally is made of comparatively light wire, and hence is light and unobstructive and easily made and handled. This part A is bent to the shape shown, being made circular at the top to conform to the top of the head and with parallel sides, having the ends terminating below the chin. All the other parts are attached to the frame A and are in adjustable and removable position, according as one or the other disposition need be made of said parts.

First of all we have the part B at the top of the frame A, which is adapted to engage the head and form a counter-support for the chin-rest. This part B is rotatably mounted on the post 2, and a binding-screw 3 serves to fasten the post adjustably and is adjustably fixed on the frame. This makes a firm engagement with the head of the subject, and especially for the chin-support C. This latter support is adjustably secured on the cross-piece D by means of post 4 and set-screw 5, and the said cross-piece or rod is itself adjustably attached to the frame A by heads 6 and binding-nuts 7. The heads 6 are in this instance threaded onto the rod D, but may be otherwise fastened, and the nuts 7 are adapted to press against the frame A and thus bind rod D firmly thereon. If deemed necessary, the frame A may be serrated or roughened on its inner or outer portion to make the engagement of rod D therewith the more secure. The chin-support C is shaped to conform to the shape of the chin, so as to leave no unfavorable impressions or marks, and, of course, depends on the head-engaging member B to get the necessary upward tension or pressure. Of course the chin support or rest will operate alone with the parts hereinbefore described.

Now in order that the eyes may be closed I provide the attachment shown enlarged in Fig. 3. This attachment or part of the whole device comprises the standard E and arm F, consisting of the upper member 10 and the lower member 12, having an elbow connection 13 and a shoulder-joint 14 with the standard E. The eye-closers proper, G, like the chin-rest C, are concavo-convex and are secured to the forearms by hinges, so as to be individually movable, and sliding heads 15, having fastening-nuts 16, serve to bind the standards E in any position of adjustment themselves in said heads or the position of the heads on the frame A, one binding-screw serving for both purposes. A wide range of adjustment and movement of the parts G is thus afforded, and they are easily removed from the frame, if preferred. The arms F may in this way be turned down into the same plane with the frame when folding of the device is desired, and the head-support B likewise may be rotated a quarter-way round to the plane of frame A when folding is necessary.

I have found by experience that the eye-closers G require different pressure in different cases, more or less, according to the special needs of the subject in hand, and to enable me to supply the need of varying pressure I employ a comparatively light spring 20 in the angle of the shoulder 14 and make this spring adjustable at its ends, either on the standard E or on arm F, or both, as here shown, having made notches in this instance to effect such adjustment. The downward pressure is thus easily varied and changed as occasion requires.

Of course when the subject has been brought to the desired composure and rest of the features the apparatus is removed.

What I claim as new, and desire to secure by Letters Patent, is—

1. The bow-shaped base-frame having two free ends, an engaging member for the top of the head pivotally fixed to said frame centrally at its top, an adjustable cross-bar connecting the sides of the frame near its free ends, and a chin-support on said bar, substantially as described.

2. The main frame and the means for fixing the same on the head of the subject, in combination with adjustable side standards, jointed arms on said standards and eye-closers on said arms, and springs in the angles of said standards and arms to govern the pressure on the eye-closers, substantially as described.

Witness my hand to the foregoing specification this 24th day of November, 1897.

ERASMUS RAUS.

Witnesses:
H. T. FISHER,
R. B. MOSER.